(12) United States Patent
Toncelli

(10) Patent No.: US 7,892,464 B2
(45) Date of Patent: Feb. 22, 2011

(54) METHOD FOR MANUFACTURING ARTICLES IN THE FORM OF SLABS OR BLOCKS WITH ACRYLIC BINDER

(76) Inventor: Luca Toncelli, Viale Asiago, 34, Bassano del Grappa (IT) I-36061

( * ) Notice: Subject to any disclaimer, the term of this patent is extended or adjusted under 35 U.S.C. 154(b) by 0 days.

(21) Appl. No.: 11/782,096

(22) Filed: Jul. 24, 2007

(65) Prior Publication Data

US 2008/0006957 A1    Jan. 10, 2008

Related U.S. Application Data

(63) Continuation of application No. PCT/EP2006/050156, filed on Jan. 11, 2006.

(30) Foreign Application Priority Data

Jan. 27, 2005    (IT) .......................... TV2005A0012

(51) Int. Cl.
  *E04B 2/84*    (2006.01)
(52) U.S. Cl. .................. 264/71; 264/102; 264/109; 264/118; 264/157; 264/236; 264/316; 264/443
(58) Field of Classification Search .................. 264/71, 264/102, 109, 112, 236, 118, 157, 316, 443
See application file for complete search history.

(56) References Cited

U.S. PATENT DOCUMENTS

| 3,904,723 | A | * | 9/1975 | Prince ............................ 264/71 |
| 4,500,674 | A | * | 2/1985 | Fontana et al. .............. 524/650 |
| 4,721,634 | A | | 1/1988 | McKinnon |
| 7,695,657 | B2 | * | 4/2010 | Toncelli ........................ 264/71 |

| 2005/0092210 | A1 | 5/2005 | Radtke, Jr. |
| 2006/0119002 | A1 | 6/2006 | Toncelli |
| 2008/0111267 | A1 | 5/2008 | Toncelli |

FOREIGN PATENT DOCUMENTS

| DE | 43 34 730 | | 4/1994 |
| GB | 2 138 734 | | 10/1984 |
| KR | 2002-0041856 | | 6/2002 |
| WO | 00/56679 | | 9/2000 |
| WO | WO 0056679 | * | 9/2000 |
| WO | 2005/014952 | | 2/2005 |
| WO | 2006/048350 | | 5/2006 |

OTHER PUBLICATIONS

International Search Report and Written Opinion of the International Searching Authority dated Jun. 13, 2006.
European Office Action dated Jun. 16, 2009, from the corresponding European Application.

* cited by examiner

*Primary Examiner*—Khanh Nguyen
*Assistant Examiner*—Saeed M Huda
(74) *Attorney, Agent, or Firm*—Katten Muchin Rosenman LLP

(57) ABSTRACT

In the sector relating to the technology of compaction by means of vacuum vibro-compression for manufacturing slabs or blocks, the organic binder resin consists of an aqueous dispersion of acrylic prepolymer in water and a filler part consists of a hydraulic binder in an amount sufficient to fix wholly or partly the water present in the initial mix; after the vibro-compression step the rough-formed article is subjected to a hardening and curing step in conditions such as to prevent the evaporation of the mix water and subsequently to a heating step so as to obtain crosslinking of the acrylic polymer. If the acrylic binder alone is used, an article with a high degree of porosity is obtained.

23 Claims, No Drawings

METHOD FOR MANUFACTURING ARTICLES IN THE FORM OF SLABS OR BLOCKS WITH ACRYLIC BINDER

The present invention relates to a novel method for manufacturing articles made of a stone conglomerate, in particular a novel method based on the known technology of compaction by means of vacuum vibro-compression.

The present invention also relates to the articles thus obtained.

For many years a technology (which combines a process and a plant), for manufacturing articles made of a stone conglomerate, in particular in the form of slabs or blocks, has been known, said technology consisting essentially in the following operations (referring in this case to the manufacture of slabs without this intended to be limiting):

preparation of an initial mix consisting of a granulate of selected and predefined grain size and a binder, which in general terms may be a cement binder or consists of a hardening resin, the granulate being chosen from among stone materials and/or ground stone-like materials, and the mix partly consisting of an inorganic material, preferably very fine quartz grain size of about 400 mesh) known as "filler" in industrial practice;

deposition of the mix on a temporary support in the form of a layer of predetermined thickness;

application, to the layer of mix, kept under a predefined vacuum, of a compaction pressure accompanied by a vibratory movement of predetermined frequency, namely, briefly, compaction by means of vacuum vibro-compression of the layer of mix;

hardening of the resultant compacted article (preceded by the setting phase in the case of a cement binder).

An example of this technology for the manufacture of slabs bonded with a polyester resin is known industrially by the name of Bretonstone.

The present invention relates to the abovementioned technology in the case where the binder is a synthetic resin. In the aforementioned conventional technology the synthetic resin normally used as a binder is a polyester resin which imparts to the product optimum physical/mechanical and shininess properties and does not have an excessive cost.

However, the use of polyester resins is accompanied by not insignificant problems and drawbacks, such as the poor resistance to ultraviolet rays, resulting in deterioration of the surface appearance of the articles (yellowing of the resin, loss of transparency, discolouring) when, after being arranged in position, they are exposed to sun for a long period of time. Consequently articles produced with polyester resin are used little for external cladding and are mainly limited to those products made of highly coloured stone granulate with a non-glossy surface.

As an alternative to polyester resin it would also be possible to use an epoxy resin or, more correctly, an epoxy system, consisting of a resin and the associated hardener, but in practice this alternative is affected by different problems and drawbacks from the point of view of industrial application.

In fact, apart from the fact that the epoxy system has a cost about triple than that of a polyester resin, compared to a slight increase in the mechanical strength, there are not insignificant drawbacks such as a low resistance to atmospheric agents and solvents. Moreover, equally significant complications arise during hardening of the articles in view of the highly complex management of this reaction.

It would be desirable to be able to apply Bretonstone technology for the manufacture of articles which can be used not only for internal cladding but also for external cladding, where it is possible to use an organic binder able to combine with the quality of the polyester resin a high resistance to ultraviolet rays.

In fact, compared to cement binders, organic binders offer major advantages, for example and not least the high mechanical strength which can be achieved.

Theoretically the solution to this problem could consist in the use of an acrylic or methacrylic resin, in view of the exceptional resistance of this category of resins, such as polymethylmethacrylate, to UV rays. It is sufficient to consider the fact that these resins, also known by the name of Plexiglas or Lexan, are commonly used to make lenses for spectacles or transparent sheets with a glass-like appearance precisely because of their exceptional resistance to solar radiation, while retaining their transparency also after very long exposure times.

In the past there have been many attempts to use in the aforementioned technology, as a methacrylate binder either acrylic resins (in the form of acrylic prepolymer syrups dispersed in methacrylate) or also mixtures of polyester resins and acrylic resins, but with entirely negative results.

The main reason for this lack of success lies in certain characteristics of the methacrylate—always present in these compounds—which has proved unsuitable for use both during vacuum vibro-compaction and during subsequent hot-hardening.

The methacrylate monomer, present in these compounds as a solvent, is very volatile, more so than styrene used in the polyester resin. Therefore, during vacuum vibro-compaction, the methacrylate evaporates immediately, making compaction of the mix practically impossible. The use of acrylic syrups also results in equally serious drawbacks, since in view of evaporation of the methacrylate in the practically air-free environment which is formed during the vibro-compaction step, the compacted article is completely discoloured.

Further drawbacks arise during subsequent hot-hardening, since the heating which precedes hardening also causes premature evaporation of the methacrylate with discolouring and cracking of the final product.

A further problem associated with use of the acrylic and methacrylic resins is that of environmental pollution, since human beings are highly sensitive to the smell of methacrylate vapours, so that these vapours, even if present in small amounts, make the environment absolutely unbearable for the production workers, this being a very serious problem in the case of an industrial plant which produces slab articles using the aforementioned technology. Therefore, hitherto, the use of conventional acrylic and methacrylic resins, i.e. those based on the use of methacrylate monomer as solvent, has not found a practical application in the aforementioned technology and the production of the associated articles has been performed using exclusively polyester resin as a binder.

It has now been found—and this forms the subject of the present invention—that the aforementioned problem is entirely solved, in an industrially advantageous manner, using a method for manufacturing articles based on the aforementioned technology and therefore in accordance with the steps indicated above, said method being characterized in that:

the binder used in the preparation of the starting mix is a water acrylic resin, namely an aqueous dispersion of acrylic prepolymer in the form of droplets with a diameter of up to about 100 nanometers;

a part of the filler consists of a hydraulic binder in a sufficient quantity to fix the water present in the aforementioned aqueous dispersion of acrylic resin; and after the vibro-compaction step the rough-formed article undergoes a hardening step and subsequent curing in conditions such as to prevent removal of the mix water due to evaporation; and after the curing step the rough-formed article undergoes a gradual heating treatment up to about 90-120° C. for about 5-24 hours in order to complete filming of the acrylic polymer and achieve crosslinking thereof.

The last three characteristic steps of the method according to the present invention, namely the addition of the hydraulic binder, curing without loss of water and high-temperature crosslinking, result in the formation of a non-porous article. In fact, when, during the aforementioned conventional method, the polyester resin is replaced by the aforementioned aqueous dispersion of acrylic prepolymer, containing on average 55-60% of water, after the vacuum vibro-compaction step (as already mentioned it is no longer affected by the problems associated with the use of an acrylic resin) the water which remains in the mix should be removed from the rough-formed compacted article. Typically, in order to perform this operation, the article is heated so that the water evaporates and at the same time the particles of acrylic polymer coalesce, forming in particular a gel and then crosslinking.

The article which is obtained in this way is compact and has a good mechanical strength, but it has a porosity in the region of 10% by volume, corresponding to the empty spaces left by the evaporated water.

With the replacement of a part of the filler normally used with a hydraulic binder in an amount sufficient to fix the water present in the resin, on the one hand the porosity is reduced to practically negligible values, so that the resultant article has a very limited porosity with absorption of water in the region of 0.3.-0.4% by weight and at the same time the properties of the article obtained are also improved.

Any one of the known binders, such as cement, gypsum, lime, pozzolana and mixtures thereof, may be used as a hydraulic binder.

Portland cement has proved to be particularly advantageous for this use and a mixture of Portland cement and high-reactivity metakaolin, for example a mixture comprising 80% Portland cement and 10-20% high-reactivity metakaolin, has proved even more advantageous and therefore preferable.

If the addition of the hydraulic binder and in particular the mixture of Portland cement and high-reactivity metakaolin is performed maintaining a low water/binder weight ratio (for example of the order of 0.15-0.20) so that the binder absorbs nearly all the water present in the mix, the desirable effect of hydration of the outer skin of the cement granules is obtained, while they remain anhydrous inside.

The advantages of the present invention may be better appreciated from the following test results.

A slab manufactured using the aforementioned technology comprising fine sand bonded with polyester resin typically has a formulation in terms of volume similar to the following:

| | |
|---|---|
| polyester resin | 19% |
| 400 mesh filler (quartz powder) | 23% |
| quartziferous sand (0.1-1.2 mm) | 58% |

If the polyester resin is replaced with a water acrylic resin, the latter typically has a water content of about 55-60% where the acrylic prepolymer is dispersed in the form of droplets in an amount equivalent to 40-45%.

Therefore the above formulation of the mix is modified as follows:

| | |
|---|---|
| water | 10% |
| dispersed acrylic prepolymer | 9% |
| 400 mesh filler (quartz powder) | 23% |
| quartziferous sand (0.1-1.2 mm) | 58% |

If, after vibro-compaction, the water were to be eliminated by means of the heating of the rough-formed slab, this would result, as already mentioned, in a compact article possessing mechanical strength, but with a porosity of about 10% by volume, corresponding to the empty spaces left by the evaporated water.

By proceeding in accordance with the preferred embodiment of the present invention and therefore replacing a substantial part of the filler or all the filler with Portland cement with a water/binder weight ratio of about 0.15-0.20, the above formulation becomes the following:

| | |
|---|---|
| water | 10% |
| dispersed acrylic prepolymer | 9% |
| Portland cement | 16% |
| 400 mesh filler (quartz powder) | 7% |
| quartziferous sand (0.1-1.2 mm) | 58% |

This formulation was used to manufacture slabs using the abovementioned technology involving compaction by means of vacuum vibro-compression, ensuring that 2.5-4%, relative to the cement weight, of a normal "superfluidifier"—a product which is known in cement product technology and widely available commercially—is added to the initial mix.

According to the aforementioned technology, the mix thus prepared is deposited in the form of a layer of the desired thickness on a temporary support and transferred to the vibro-compaction step which, according to this invention, is carried out on the layer of mix enclosed between two sheets of plastic material which are impermeable to water vapour.

After vibro-compaction, the rough-formed slab, which is still enclosed between the two sheets of impermeable plastic material which moreover are sealed along the edges so as to form a sealed cover, undergoes a hardening step and subsequent curing lasting about one week.

During the course of curing, nearly all the water present in the mix is fixed by the Portland cement, so that the particles of acrylic polymer may undergo coalescence with consequent filming.

At the end of the curing period the rough-formed slab already has a good consistency with a reasonable flexural tensile resistance, due to the hydration mechanism of the cement and to filming of the polymer.

The slab is then transferred to the final step where gradual heating is performed so as to avoid violent thermal shocks affecting the slab, up to about 90-120° C. for about 5-24 hours, so as to complete filming of the acrylic polymer and achieve crosslinking thereof.

At the same time the extremely small quantity of residual water is removed by means of evaporation, but does not leave any trace of appreciable porosity.

From an examination of the resultant slab product, after cooling, the following characteristics are determined:

flexural tensile strength of 38-42 N/mm2;

very limited porosity with water absorption of 0.3-0.4%;

high resistance to UV rays, confirmed by the absence of signs of deterioration after 1000 hours spent in the accelerated ageing instrument called an "veterometer".

In the addition to the advantages proven by the properties indicated above it must be emphasized that the use of a water acrylic binder is ecologically compatible.

With the method according to the present invention it is also possible to manufacture blocks which then undergo sawing.

In this case, in place of two sheets of plastic impermeable to water vapour sealed along their edges so as to form a cover, a bag made of the same material is preferably used to enclose the block, forming a sealed casing along the mouth.

After the hardening and subsequent curing step, which in this case also lasts about one week, a rough-formed block which has a sufficient strength to be usefully cut into slabs is obtained. The slabs, after sawing, are then transferred to the final stage, where gradual heating is performed, to avoid subjecting them to violent thermal shocks, up to about 90-120° C. for about 5-24 hours, in order to complete filming of the acrylic polymer and achieve crosslinking thereof.

It is also possible to envisage the addition of an organofunctional silane to the formulation according to the present invention (which in this case is added to the water in which the acrylic prepolymer is suspended in an amount equal to 1-2% by weight relative to the acrylic resin). In this way the adhesion between acrylic binder and the siliceous inert substances is improved and, ultimately, the mechanical strength of the final article is increased.

The invention has been described in relation to a preferred embodiment, it being understood that conceptually equivalent modifications and variants are possible and may be envisaged without departing from the scope thereof.

In particular these variants may relate to the component or components which partly replace the filler with the function of fixing the water such as pozzolana cement and/or high-reactivity metakaolin, provided that the fixing action is converted into formation of a solid phase which contributes to the mechanical strength of the slab article and prevents the final formation of an unacceptable degree of porosity.

As already mentioned, if instead a slab article with a notable porosity should be required, it is sufficient to dispense with addition of the water fixing agent, in particular Portland cement, envisaging during the process a step for eliminating the water by means of evaporation.

The invention claimed is:

1. A method for manufacturing articles in the form of slabs, the method comprising the steps of:
   (a) preparing an initial mix, the initial mix consisting of a granulate of a selected and predefined grain size and a binder, wherein
      the granulate being chosen from one of a stone material and a ground stone-like materials and comprising one of an inorganic material and a very fine filler,
      the binder comprising an aqueous dispersion of an acrylic prepolymer resin in a form of droplets with a diameter of up to about 100 nanometers, and
      the filler comprising a hydraulic binder in a sufficient quantity to fix the water present in the aqueous dispersion of the acrylic resin;
   (b) depositing the initial mix as a layer of predetermined thickness temporary support or inside a mold;
   (c) vacuum vibro-compacting the layer under a predefined vacuum and a predetermined compaction pressure accompanied by a vibratory movement of a predetermined frequency to form a rough-formed article, wherein vacuum, vibration, and compaction are performed simultaneously;
   (d) hardening and curing the rough-formed article and binding the water that was added in the aqueous dispersion in the article; and
   (e) heating the rough-formed article to 90-120° C. for 5-24 hours and complete filming of the polymer and crosslinking thereof;
   wherein step (d) is performed by enclosing said rough-formed article inside a casing of plastic material impermeable to water vapor.

2. Method according to claim 1, wherein said hydraulic binder is chosen from among cement, gypsum, lime, pozzolana and mixtures thereof.

3. Method according to claim 2, wherein said hydraulic binder is Portland cement.

4. Method according to claim 2, wherein said hydraulic binder is a mixture of Portland cement and high-reactivity metakaolin.

5. Method according to claim 4, wherein said hydraulic binder is a mixture comprising 80-90% by weight of Portland cement and 10-25% of high-reactivity metakaolin.

6. Method according to claim 4, wherein 2.5-4%, relative to the weight of cement, of a normal superfluidifier, of the type used in cement mixes, is added to said initial mix.

7. Method according to claim 1, wherein an organofunctional silane is added to the initial mix.

8. Method according to claim 7, wherein said silane is added in a quantity equal to 1-2% by weight relative to the acrylic resin.

9. Method according to claim 7, wherein said silane is added to the suspension water of said acrylic resin.

10. Method according to claim 1, wherein said curing is performed for a week.

11. Method according to claim 1, wherein if the rough-formed article is in the form of a block, after step (d) a stage involving sawing into slabs is performed.

12. Method according to claim 1, wherein in order to obtain a porous article, said initial mix is prepared with the sole aqueous dispersion of acrylic prepolymer, dispensing with the addition of a hydraulic binder for fixing the water and envisaging during the process a step for eliminating the water by means of evaporation.

13. A method for manufacturing articles in the form of slabs or blocks, the method comprising the steps of:
   preparing an initial mix, the initial mix consisting of a granulate of a selected and predefined grain size and a binder, wherein
      the granulate being chosen from one of a stone material and a ground stone-like materials and comprising one of an inorganic material and a very fine filler,
      the binder comprising an aqueous dispersion of an acrylic prepolymer resin in a form of droplets with a diameter of up to about 100 nanometers, and
      the filler comprising a hydraulic binder in a sufficient quantity to fix the water present in the aqueous dispersion of the acrylic resin;
   depositing the first mix as a layer of predetermined thickness on a temporary support or inside a mould;
   vacuum vibro-compacting the layer under a predefined vacuum and a predetermined compaction pressure accompanied by a vibratory movement of a predetermined frequency to form a rough-formed article, wherein vacuum, vibration, and compaction are performed simultaneously; and hardening and curing the rough-formed article and binding the water that was added in the aqueous dispersion in the article.

14. A method for manufacturing articles in the form of slabs from a block, the method comprising the steps of:
   (a) preparing an initial mix, the initial mix consisting of a granulate of a selected and predefined grain size and a binder, wherein
      the granulate being chosen from one of a stone material and a ground stone-like materials and comprising one of an inorganic material and a very fine filler,
      the binder comprising an aqueous dispersion of an acrylic prepolymer resin in a form of droplets with a diameter of up to about 100 nanometers, and
      the filler comprising a hydraulic binder in a sufficient quantity to fix the water present in the aqueous dispersion of the acrylic resin;
   (b) depositing the initial mix as a layer of predetermined thickness on a temporary support or inside a mold;
   (c) vacuum vibro-compacting the layer under a predefined vacuum and a predetermined compaction pressure accompanied by a vibratory movement of a predetermined frequency to form a rough-formed article in a form of the block, wherein vacuum, vibration, and compaction are performed simultaneously;
   (d) hardening and curing the rough-formed article and binding the water that was added in the aqueous dispersion in the article;
   (e) sawing the block into a plurality of slabs;
   (f) heating the slabs to 90-120° C. for 5-24 hours and complete filming of the polymer and cross-linking thereof;
   wherein step (d) is performed by enclosing said rough-formed article inside a casing of plastic material impermeable to water vapor.

15. Method according to claim 14, wherein said hydraulic binder is chosen from among cement, gypsum, lime, pozzolana and mixtures thereof 16. Method according to claim 15, wherein said hydraulic binder is Portland cement.

17. Method according to claim 15, wherein said hydraulic binder is a mixture of Portland cement and high-reactivity metakaolin.

18. Method according to claim 17, wherein said hydraulic binder is a mixture comprising 80-90% by weight of Portland cement and 10-25% of high-reactivity metakaolin.

19. Method according to claim 17, wherein 2.5-4%, relative to the weight of cement, of a normal superfluidifier, of the type used in cement mixes, is added to said initial mix.

20. Method according to claim 14, wherein an organofunctional silane is added to the initial mix.

21. Method according to claim 20, wherein said silane is added in a quantity equal to 1-2% by weight relative to the acrylic resin.

22. Method according to claim 20, wherein said silane is added to the suspension water of said acrylic resin.

23. Method according to claim 14, wherein in order to obtain a porous article, said initial mix is prepared with the sole aqueous dispersion of acrylic prepolymer, dispensing with the addition of a hydraulic binder for fixing the water and envisaging during the process a step for eliminating the water by means of evaporation.

* * * * *